(12) United States Patent
Robbins et al.

(10) Patent No.: US 11,472,904 B2
(45) Date of Patent: Oct. 18, 2022

(54) PRODUCTION OF LIGHT-TRANSMISSIVE OBJECTS BY ADDITIVE MANUFACTURING

(71) Applicant: Carbon, Inc., Redwood City, CA (US)

(72) Inventors: Gregory R. Robbins, Redwood City, CA (US); Steven Kenneth Pollack, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 16/488,638

(22) PCT Filed: Sep. 17, 2018

(86) PCT No.: PCT/US2018/051289
§ 371 (c)(1),
(2) Date: Aug. 26, 2019

(87) PCT Pub. No.: WO2019/060239
PCT Pub. Date: Mar. 28, 2019

(65) Prior Publication Data
US 2020/0024381 A1    Jan. 23, 2020

Related U.S. Application Data

(60) Provisional application No. 62/561,829, filed on Sep. 22, 2017.

(51) Int. Cl.
*C08F 222/10* (2006.01)
*B33Y 10/00* (2015.01)
(Continued)

(52) U.S. Cl.
CPC .......... *C08F 222/10* (2013.01); *B29C 64/124* (2017.08); *B29C 64/35* (2017.08);
(Continued)

(58) Field of Classification Search
None
See application file for complete search history.

(56) References Cited

U.S. PATENT DOCUMENTS 3,213,058 A    10/1965   Boyle et al.
4,816,496 A     3/1989   Wada et al.
(Continued)

FOREIGN PATENT DOCUMENTS

CN    106687861 A    5/2017
EP       0282634       9/1988
(Continued)

OTHER PUBLICATIONS

Tubleston et al. "Continuous liquid interface production of 3D objects" Science, 347: 1349-1352 (2015).
(Continued)

*Primary Examiner* — Timothy Kennedy
*Assistant Examiner* — Olukorede Esan
(74) *Attorney, Agent, or Firm* — Myers Bigel, P.A.

(57) ABSTRACT

Provided herein is a method of making a clear or translucent object by additive manufacturing, comprising (a) providing a clear or translucent light polymerizable resin, the resin comprising: (i) light-polymerizable monomers, prepolymers, or a combination thereof; (ii) a photoinitiator; and (iii) a polysubstituted linear polyacene ultraviolet light absorbing compound which compound is polysubstituted with bromo, chloro, —Se—R', —S—R' or combinations thereof, where each R' is independently selected from alkyl, aryl, and arylalkyl; and then (b) producing by stereolithography with ultraviolet light a clear or translucent object from said light polymerizable resin.

17 Claims, 2 Drawing Sheets

(51) Int. Cl.
*B33Y 40/00* (2020.01)
*B33Y 70/00* (2020.01)
*B29C 64/124* (2017.01)
*B29C 64/35* (2017.01)
*C08K 5/45* (2006.01)
*C08F 220/34* (2006.01)
*B33Y 80/00* (2015.01)

(52) U.S. Cl.
CPC .............. *B33Y 10/00* (2014.12); *B33Y 40/00* (2014.12); *B33Y 70/00* (2014.12); *C08F 220/343* (2020.02); *C08K 5/45* (2013.01); *B29K 2995/0026* (2013.01); *B33Y 80/00* (2014.12)

(56) References Cited

U.S. PATENT DOCUMENTS

| | | | |
|---|---|---|---|
| 5,236,637 | A | 8/1993 | Hull |
| 5,391,072 | A | 2/1995 | Lawton et al. |
| 5,529,473 | A | 6/1996 | Lawton et al. |
| 5,639,413 | A | 6/1997 | Crivello |
| 5,705,116 | A * | 1/1998 | Sitzmann ............... G03F 7/0037 264/401 |
| 6,417,243 | B1 * | 7/2002 | Peeters .................. C08G 63/91 528/65 |
| 6,610,794 | B1 * | 8/2003 | Sakurai ................... C08L 67/03 525/425 |
| 6,916,867 | B2 | 7/2005 | Gugumus |
| 7,157,586 | B2 | 1/2007 | Wood et al. |
| 7,438,846 | B2 | 10/2008 | John |
| 7,695,643 | B2 | 4/2010 | Fritzsche et al. |
| 7,892,474 | B2 | 2/2011 | Shkolnik et al. |
| 8,110,135 | B2 | 2/2012 | El-Siblani |
| 8,933,065 | B2 | 1/2015 | Kohn et al. |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,453,142 | B2 | 9/2016 | Rolland et al. |
| 9,598,606 | B2 | 3/2017 | Rolland et al. |
| 9,676,963 | B2 | 6/2017 | Rolland et al. |
| 2003/0032692 | A1 * | 2/2003 | Mejiritski ............... B33Y 10/00 522/173 |
| 2012/0279566 | A1 | 11/2012 | Bruder et al. |
| 2013/0292862 | A1 | 11/2013 | Joyce |
| 2013/0295212 | A1 | 11/2013 | Chen et al. |
| 2016/0136889 | A1 * | 5/2016 | Rolland ................. B33Y 10/00 264/1.27 |
| 2017/0173866 | A1 | 6/2017 | Schonenberg et al. |

FOREIGN PATENT DOCUMENTS

| | | |
|---|---|---|
| JP | H09194816 A | 7/1997 |
| JP | H09217051 A | 8/1997 |
| JP | H10502461 A | 3/1998 |
| JP | H10152548 A | 6/1998 |
| JP | H10251615 A | 9/1998 |
| JP | 2017524565 A | 8/2017 |
| WO | 96/00412 | 1/1996 |

OTHER PUBLICATIONS

International Search Report and Written Opinion corresponding to International Application No. PCT/US2018/051289 (dated Dec. 19, 2018) (9 pages).

Januszieweez et al. "Layerless Fabrication with Continuous Liquid Interface Production" Proc. Natl. Acad. Sci. USA, 113(42): 11703-11708 (2016).

Tubleston et al. "Supplementary Materials of Continuous liquid interface production of 3D objects" Science, 347 (1349) (2015) (13 pages).

Chinese Office Action corresponding to CN 201880061323.8; dated Aug. 21, 2020 (17 pages, including English translation).

Chinese Office Action corresponding to CN 201880061323.8; dated Feb. 7, 2021 (18 pages, including English translation).

Aspler, J. , et al., "Initiation of polypropylene photooxidation. 1. Polynuclear aromatic compounds", Macromolecules, 9(5), 1976, 691-695.

Balta, Demet Karaca, et al., "Mechanism of Photoinitiated Free Radical Polymerization by Thioxanthone-Anthracene in the Presence of Air", Macromolecules, 44(8), 2011, 2531-2535.

Santra, Sourav K., et al., "Visible-Spectrum Solar-Light-Mediated Benzylic C—H Oxygenation Using 9, 10-Dibromoanthracene as an Initiator", The Journal of Organic Chemistry, 86(1), 2020, 1164-1171.

Chinese Office Action corresponding to CN 201880061323.8; dated Jun. 4, 2021 (10 pages, including English translation).

Japanese Office Action corresponding to JP 2020-515228; dated Jul. 12, 2022, (15 pages, including English translation).

* cited by examiner

PRODUCTION OF LIGHT-TRANSMISSIVE OBJECTS BY ADDITIVE MANUFACTURING

Cross Reference to Related Applications

This application is a 35 U.S.C. § 371 national phase application of International Application Serial No. PCT/US2018/051289, filed Sep. 17, 2018, which claims the benefit of U.S. provisional patent application ser. no. 62/561,829, filed Sep. 22, 2017, the disclosure of which is incorporated by reference herein in its entirety.

FIELD OF THE INVENTION

The present invention concerns methods of making three-dimensional objects, particularly clear or translucent objects, by additive manufacturing of a light polymerizable resin.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and U.S. Pat. No. 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606). Unfortunately, light-transmissive (clear or translucent) resins, for the production of clear or translucent objects, can exhibit undesired polymerization during stereolithography, adding to the objects being produced additional polymerized regions where no polymerization is intended. Akin to the phenomenon known as "flashing" in injection molding, this phenomenon is referred to as "caping." Since clear or translucent objects are one desirable category of objects for stereolithography, solutions to the problem of caping are needed.

SUMMARY OF THE INVENTION

A first aspect of the invention is a method of making a clear or translucent object by additive manufacturing, comprising:

(a) providing a clear or translucent light polymerizable resin, the resin comprising: (i) light-polymerizable monomers, prepolymers, or a combination thereof (e.g., in an amount of from 5 or 10 percent by weight to 80 or 90 percent by weight); (ii) a photoinitiator (e.g., in an amount of from 0.1 percent by weight to 4 percent by weight); and (iii) a polysubstituted linear polyacene (e.g., anthracene) ultraviolet light absorbing compound (e.g., in an amount of 0.01, 0.05 or 0.1 percent by weight to 1, 2, 5, 10 or 20 percent by weight), which compound is polysubstituted with bromo, chloro, —Se—R', —S—R' or combinations thereof, wherein each R' is independently selected from alkyl, aryl, and arylalkyl; and then (b) producing by stereolithography with ultraviolet light a clear or translucent object from said light polymerizable resin.

In some embodiments, the producing step is carried out by bottom-up stereolithography (e.g., continuous liquid interface production).

In some embodiments, the light-polymerizable monomers, prepolymers, or a combination thereof are free-radical polymerizable.

In some embodiments, the resin further comprises a reactive diluent (e.g., in an amount of 1 or 2 percent by weight to 30 or 40 percent by weight).

In some embodiments, the resin comprises a dual cure resin.

In some embodiments, the resin has a light absorption coefficient, alpha, of from 0.0005 or 0.001, to 0.01 or 0.05.

In some embodiments, the method further comprises the steps of:

(c) washing the object; and then
(d) further curing the object (e.g., by baking).

The method may be used to make a variety of different objects, including but not limited to dental aligners, lenses, lens covers, and windows. The objects may be rigid, flexible, or elastic, depending on the choice of resin constituents, as is known in the art.

A further aspect of the invention is objects produced by the methods described herein.

A further aspect of the invention is clear or translucent light polymerizable resins, as described above, and described further below.

U.S. Pat. No. 5,705,116 to Sitzmann et al. describes the use of certain anthracenes to increase to the useful range of cationic photoinitiators in stereolithography, but is not concerned with caping, and does not suggest the substituents described herein.

Prior U.S. Pat. Nos. 9,676,963, 9,453,142 and 9,598,606 to Rolland et al. describe with regard to non-reactive light absorbers that polymerizable liquids may include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a a hydroxybenzophenone, hydroxyphenylbenzotriazole, oxanilide, benzophenone, thioxanthone, hydroxypenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. No. 3,213,058 [benzotriazoles]; U.S. Pat. No. 6,916,867 [mixtures of hydroxybenzophenone, 2-hydroxyphenylbenzotriazole, oxanilide, and/or 2-hydroxyphenyltriazine]; U.S. Pat. No. 7,157,586 [benzotriazoles]; and U.S. Pat. No. 7,695,643 [benzotriazoles].

However, the UV-absorbers described in the present application are neither suggested nor described in those prior patents (or other prior patents and applications to Rolland et al.), the problem of caping of clear or translucent resins is neither suggested nor described therein, and the use of the absorbers described herein to reduce caping during production of light-transmissive objects is neither suggested nor described therein.

BRIEF DESCRIPTION OF THE DRAWINGS

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
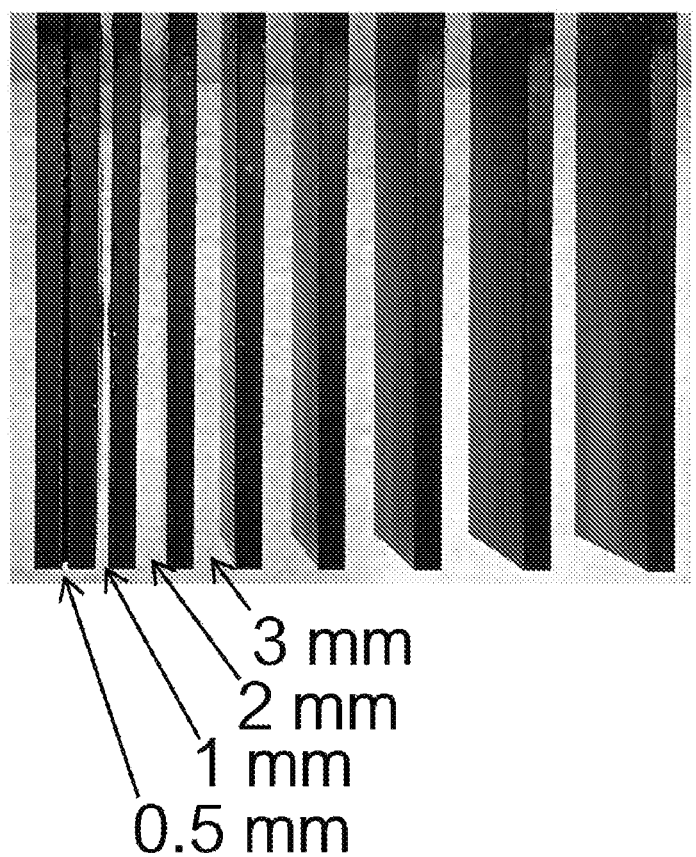
FIG. 1 shows a set of test objects, in the form of vertical parallel plates spaced apart by gradually increasing distances from left to right, produced from Carbon Inc. RPU70 black resin on a Carbon Inc. M1 additive manufacturing apparatus. The carrier plate, or carrier platform, for the objects appears in part at the top of the Figure.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

"Alkyl" as used herein alone or as part of another group, refers to a straight or branched chain hydrocarbon containing from 1 to 10 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Loweralkyl" as used herein, is a subset of alkyl, in some embodiments preferred, and refers to a straight or branched chain hydrocarbon group containing from 1 to 4 carbon atoms. Representative examples of lower alkyl include, but are not limited to, methyl, ethyl, n-propyl, iso-propyl, n-butyl, iso-butyl, tert-butyl, and the like. Such groups can be unsubstituted or substituted with one or more (e.g., one, two, three four, etc.) independently selected electron-donating or electron-withdrawing groups.

"Aryl" as used herein alone or as part of another group, refers to a monocyclic carbocyclic ring system or a bicyclic carbocyclic fused ring system having one or more aromatic rings. Representative examples of aryl include, azulenyl, indanyl, indenyl, naphthyl, phenyl, tetrahydronaphthyl, and the like. The term "aryl" is intended to include both substituted and unsubstituted aryl unless otherwise indicated and these groups may be substituted with the same groups as set forth in connection with alkyl and loweralkyl above. Such groups can be unsubstituted or substituted with one or more (e.g., one, two, three four, etc.) independently selected electron-donating or electron-withdrawing groups.

"Arylalkyl" as used herein refers to an aryl group as described above, covalently coupled to an alkyl group as described above, which alkyl group is in turn coupled to the core molecule.

"Electron-withdrawing" and "electron donating" refer to the ability of a substituent to withdraw or donate electrons relative to that of hydrogen if the hydrogen atom occupied the same position in the molecule. These terms are well understood by one skilled in the art and are discussed in Advanced Organic Chemistry, by J. March, John Wiley and Sons, New York, N.Y., pp. 16-18 (1985), incorporated herein by reference. Examples of such electron withdrawing and electron donating groups or substituents include, but are not limited to halo, nitro, cyano, carboxy, alkylcarboxy, loweralkenyl, loweralkynyl, loweralkanoyl (e.g., formyl), carboxyamido, aryl, quaternary ammonium, aryl (loweralkanoyl), carbalkoxy and the like; acyl, carboxy, alkanoyloxy, aryloxy, alkoxysulfonyl, aryloxysulfonyl, and the like; hydroxy, alkoxy or loweralkoxy (including methoxy, ethoxy and the like); loweralkyl; amino, alkylamino, lower alkylamino, di(loweralkyl)amino, aryloxy (such as phenoxy), mercapto, loweralkylthio, lower alkylmercapto, disulfide (loweralkyldithio) and the like; 1-piperidino, 1-piperazino, 1-pyrrolidino, acylamino, hydroxyl, thiolo, alkylthio, arylthio, aryloxy, alkyl, ester groups (e.g., alkylcarboxy, arylcarboxy, heterocyclocarboxy), azido, isothiocyanato, isocyanato, thiocyanato, cyanato, and the like. One skilled in the art will appreciate that the aforesaid substituents may have electron donating or electron withdrawing properties under different chemical conditions. See, e.g., U.S. Pat. No. 8,933,065 to Kohn.

"Caping" as used herein refers to unintended polymerization of a photopolymerizable resin during additive manufacturing, particularly stereolithography, in regions for which no polymerization is intended, frequently leading to distortion of the object and rejection of that object.

"Light absorption coefficient" or "alpha," as used herein, is determined in accordance with known techniques. See, e.g., J. Tumbleston et al., *Continuous liquid interface production of 3D objects*, Science 347:1349, Supplementary Materials (2015).

1. UV Absorbers.

As noted above, ultraviolet (UV) light absorbing compounds useful in the present invention are, in general, polysubstituted linear polyacenes (e.g., naphthalene, anthracene, tetracene, pentacene, hexacene). The compounds are polysubstituted with two or more of bromo, chloro, —Se—R', —S—R', or combinations thereof, where each R' is independently selected from alkyl, aryl, and arylalkyl.

More particularly, the light absorbing compounds can have a structure of Formula I:

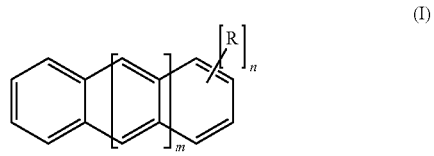

(I)

wherein:
m is 0, 1, 2, 3, 4 or 5;
n is from 2 to 4, 6 or 8; and each R is independently selected from the group consisting of: bromo, chloro, —Se—R', and —S—R', where each R' is independently selected from alkyl, aryl, and arylalkyl. In some embodiments, bromo is preferred.

Examples of suitable compounds include, but are not limited to, 9,10-dibromoanthracene, 2,3,9,10-tetrabromoanthracene, and 5,11-dibromotetracene. A particular example has the structure:

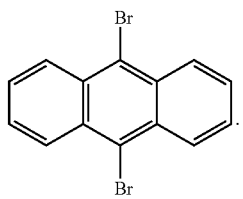 [SMILES: Brc1c2ccccc2c(Br)c2ccccc12]

2. Resins.

In general, resins into which the UV-absorbers described herein are included further comprise: (a) light-polymerizable monomers and/or prepolymers that can form an object, (b) a photoinitiator as described below, and (c) optionally (but in the case of some complete "dual cure" resins preferably) heat (or microwave, RF energy)-polymerizable (or otherwise further polymerizable) monomers and/or prepolymers. Other optional resin ingredients are discussed further below. Constituents of dual cure resins are described below, and in U.S. Pat. Nos. 9,676,963, 9,453,142 and 9,598,606 to Rolland et al., the disclosures of which are incorporated herein by reference in their entirety.

A. Light-Polymerizable Monomers and/or Prepolymers.

Sometimes also referred to as "Part A" of the resin, these are monomers and/or prepolymers that can be polymerized by exposure to actinic radiation or light. This resin can have a functionality of 2 or higher. A purpose of Part A is to "lock" the shape of the object being formed (and in the case of "dual cure" resins, create a scaffold for the one or more additional components (e.g., Part B)). Importantly, Part A is present at or above the minimum quantity needed to maintain the shape of the object being formed after the initial solidification during photolithography. In some embodiments, this amount corresponds to less than ten, twenty, or thirty percent by weight of the total resin (polymerizable liquid) composition.

Examples of suitable reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

Note that, in some embodiments, a light polymerizable component (a "Part A" component), once polymerized, may degrade during further curing (e.g., during heating or baking) to form a constituent for the further (e.g., heat) cure. Thus, it is converted, in part, to a "Part B" component, though other portions (e.g., remaining light-reactive blocking groups such as t-BAEMA), may not participate in the further cure, and hence make little or no contribution to the mechanical properties of the final product.

B. Photoinitiators.

Photoinitiators included in the polymerizable liquid (resin) can be any suitable photoiniator, including type I and type II photoinitiators and including commonly used UV photoinitiators, examples of which include but are not limited to acetophenones (diethoxyacetophenone for example), phosphine oxides diphenyl(2,4,6-trimethylbenzoyl)phosphine oxide (TPO), phenylbis(2,4,6-trimethylbenzoyl) phosphine oxide (PPO), Irgacure 369, etc. See, e.g., U.S. Pat. No. 9,453,142 to Rolland et al.

C. Heat-Polymerizable Monomers and/or Prepolymers.

Sometimes also referred to as "Part B", these constituents may comprise, consist of or consist essentially of a mix of monomers and/or prepolymers that possess reactive end groups that participate in a second solidification reaction after the Part A solidification reaction. In general, for dual cure resins, examples of methods used to solidify Part B include, but are not limited to, contacting the object or scaffold to heat, water or water vapor, light at a different wavelength than that at which Part A is cured, catalysts, (with or without additional heat), evaporation of a solvent from the polymerizable liquid (e.g., using heat, vacuum, or a combination thereof), microwave irradiation, etc., including combinations thereof. In this case, heat curing of the "Part B" resins is preferred.

Examples of suitable reactive end group pairs for Part B constituents, monomers or prepolymers include, but are not limited to: epoxy/amine, epoxy/hydroxyl, oxetane/amine, oxetane/alcohol, isocyanate*/hydroxyl, isocyanate*/amine, isocyanate/carboxylic acid, anhydride/amine, amine/carboxylic acid, amine/ester, hydroxyl/carboxylic acid, hydroxyl/acid chloride, amine/acid chloride, vinyl/Si—H (hydrosilylation), Si—Cl/hydroxyl, Si—Cl/amine, hydroxyl/aldehyde, amine/aldehyde, hydroxymethyl or alkoxymethyl amide/alcohol, aminoplast, alkyne/Azide (also known as one embodiment of "Click Chemistry," along with additional reactions including thiolene, Michael additions, Diels-Alder reactions, nucleophilic substitution reactions, etc.), alkene/sulfur (polybutadiene vulcanization), alkene/peroxide, alkene/thiol, alkyne/thiol, hydroxyl/halide, isocyanate*/water (polyurethane foams), Si—OH/hydroxyl, Si—OH/water, Si—OH/Si—H (tin catalyzed silicone), Si—OH/Si—OH (tin catalyzed silicone), perfluorovinyl (coupling to form perfluorocyclobutane), etc., where *isocyanates include protected isocyanates (e.g. oximes)), diene/dienophiles for Diels-Alder reactions, olefin metathesis polymerization, olefin polymerization using Ziegler-Natta catalysis, ring-opening polymerization (including ring-opening olefin metathesis polymerization, lactams, lactones, siloxanes, epoxides, cyclic ethers, imines, cyclic acetals, etc.), etc. As will be noted from the above, the "Part B" components generally comprise at least a pair of compounds, reactive with one another (e.g., a polyisocyanate, and a polyamine).

D. Additional Resin Ingredients.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to m average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Fillers.

Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners.

One or more polymeric and/or inorganic tougheners can be used as a filler in the present invention. See generally US Patent Application Publication No. 20150215430. The toughener may be uniformly distributed in the form of particles in the cured product. The particles could be less than 5 microns (m) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-Shell Rubbers.

Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, and Kaneka Kane Ace MX 257 and Kaneka Kane Ace MX 120 core-shell rubber dispersions, and mixtures thereof.

Organic Diluents.

In some embodiments, diluents for use in the present invention are preferably reactive organic diluents: That is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to not more than 15,000, 10,000, 6,000, 5,000, 4,000, or 3,000 centipoise at 25 degrees Celsius). Suitable examples of diluents include, but are not limited to, N,N-dimethylacrylamide, N-vinyl-2-pyrrolidone, and N-vinyl formamide, or a mixture thereof. The diluent may be included in the polymerizable liquid in any suitable amount, typically from 1, 5 or 10 percent by weight, up to about 30 or 40 percent by weight, or more.

3. Methods of Use.

Techniques for additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

CLIP is known and described in, for example, U.S. Pat. Nos. 9,211,678; 9,205,601; and U.S. Pat. No. 9,216,546 to DeSimone et al.; and also in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (2016). In some embodiments, CLIP employs features of a bottom-up three dimensional fabrication as described above, but the irradiating and/or advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. The inhibitor may pass entirely through the semipermeable member, or a "pool" of inhibitor may reside within the semipermeable member and pass through the resin contact surface thereof, as described in DeSimone et al. (referenced above), and also in Sun et al., US Patent Application Publication No. US 2016/0288376. While a preferred inhibitor is oxygen, other inhibitors, such as bases (including amines) as described in DeSimone et al., or those described in Sun et al., may also be used. Other approaches for carrying out CLIP that can be used in the present invention and potentially obviate the need for a semipermeable "window" or window structure include utilizing a liquid interface comprising an immiscible liquid (see L. Robeson et al., WO 2015/164234), generating oxygen as an inhibitor by electrolysis (see I. Craven et al., WO 2016/133759), and incorporating magnetically positionable particles to which the photoactivator is coupled into the polymerizable liquid (see J. Rolland, WO 2016/145182).

In one non-limiting embodiment, the object may be produced on a Carbon Inc. M1 additive manufacturing apparatus, available from Carbon, Inc., 1089 Mills Way, Redwood City, Calif. 94063 USA.

After the intermediate three-dimensional object is formed, it is optionally washed, optionally dried (e.g., air dried) and/or rinsed (in any sequence). In some embodiments (employing "dual cure" resins), it is then further cured, such as by heating.

Heating may be active heating (e.g., baking in an oven, such as an electric, gas, solar oven or microwave oven, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—may in some embodiments also be employed.

The present invention is explained in greater detail in the following non-limiting Examples.

Comparative Example A

Lack of Substantial Caping in Black RPU 70 Resin

In stereolithography, "caping" is unintended polymerization of a resin during fabrication in regions that should remain empty or unpolymerized.

When fabricating a set of vertical plate test objects on a Carbon, Inc. M1 additive manufacturing apparatus, no significant caping is seen with Carbon Inc. RPU70 black resin (see FIG. 1). The resin light absorption coefficient, alpha, of the black RPU70 resin was 0.0042, with alpha as defined in J. Tumbleston et al., *Continuous liquid interface production of 3D objects*, Science 347:1349, Supplementary Materials (2015).

If a clear version of RPU70 is prepared (with black pigment absent), then poor z-resolution is expected due to the low alpha (low resin light absorption coefficient). Accordingly, it was attempted to improve Z-axis resolution in a clear resin by adding a UV absorbing compound, as described below.

Example 1

Caping with Clear Resin Containing Mayzo OB+ UV Absorber

The AUTODESK PR48 standard clear prototyping resin contains:
 Oligomer: Allnex Ebecryl 8210 39.776%, Sartomer SR 494 39.776%;
 Photoinitiator: Esstech TPO+ (2,4,6-Trimethylbenzoyl-diphenylphosphineoxide) 0.400%;
 Reactive diluent: Rahn GenA clomer 1122 19.888%;
 UV blocker: Mayzo OB+ (2,2'-(2,5-thiophenediyl)bis(5-tertbutylbenzoxazole)) 0.160%; (all percentages are wt/wt).

When a resin like RPU70 was prepared, without black pigment, but with Mayzo OB+ as the UV absorber, and objects produced on a Carbon Inc. M1 apparatus, caping was again observed. We noted that the caping seemed to involve the amines of the "Part B" component, and that, when the "Part B" amines were removed from the resin the caping was much reduced. However, in spite of the presence of the UV blocker OB+, caping is observed under production conditions similar to those described for the RPU70 black resin above.

Example 2

Lack of Caping with Clear Resin Containing CARBOPROTECT® UV Absorber

Figure 2:
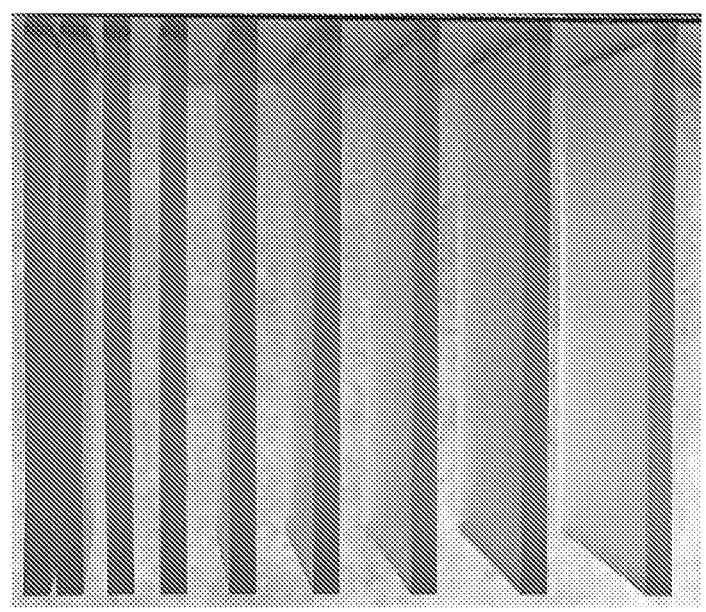
FIG. 2 shows a set of test objects like that of FIG. 1 and produced in like manner from a similar resin, except that no black pigment is included, and BASF CARBOPROTECT® UV absorber was included.

A clear resin similar to Carbon Inc. RPU 70 was prepared, except that black pigment was omitted, and BASF Carbo-Protect® UV absorber (designed for solvent-based clear or semi-transparent coatings over carbon fiber reinforced materials) was included. The resin alpha was 0.0044. Test objects like that shown in FIG. 1 were then produced with the resin in like manner as in FIG. 1, with results shown in FIG. 2. No substantial caping was seen. However, substantial yellowing of the objects was observed.

A generic structure encompassing CarboProtect® UV Absorber is given in BASF US Patent Application Publication No. US 20120279566.

Comparative Example B

Caping with Clear Resin Containing 9,10-Diethoxyanthracene UV Absorber

U.S. Pat. No. 5,705,116 to Sitzmann (noted above) states that anthracenes having pendant alkoxy groups are preferred for use with light at certain wavelengths.

Figure 3:
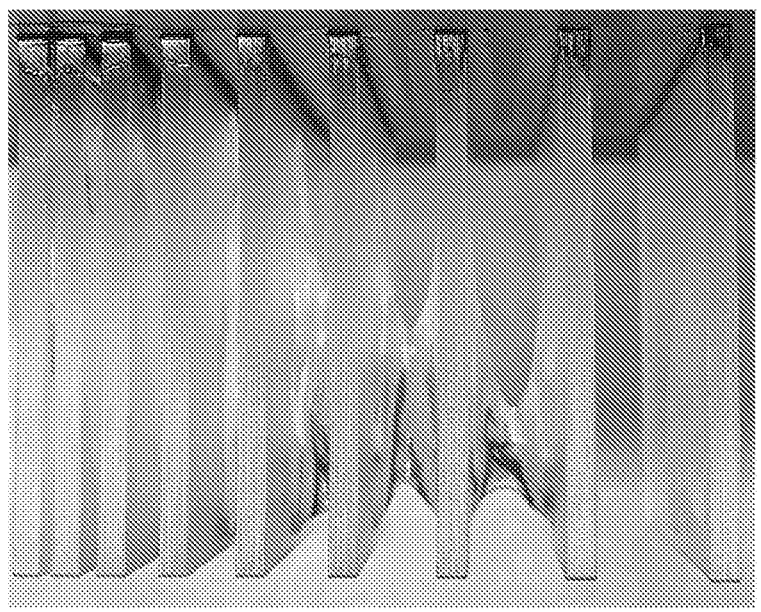
FIG. 3 shows a set of test objects like that of FIG. 1 and produced in like manner from a similar resin, except that no black pigment is included, and 9,10-diethoxyanthracene was included.

A clear resin similar to Carbon Inc. RPU 70 was prepared, except that black pigment was omitted, and 9,10-diethoxy-anthracene was included as a UV absorber. The resin alpha was 0.0044. Test objects like that shown in FIG. 1 were then produced with the resin in like manner as in FIG. 1, with results shown in FIG. 3. No substantial yellowing was observed. Unfortunately, substantial caping was seen.

Example 3

Lack of Caping with Clear Resin Containing 9,10-Dibromoanthracene UV Absorber

Figure 4:
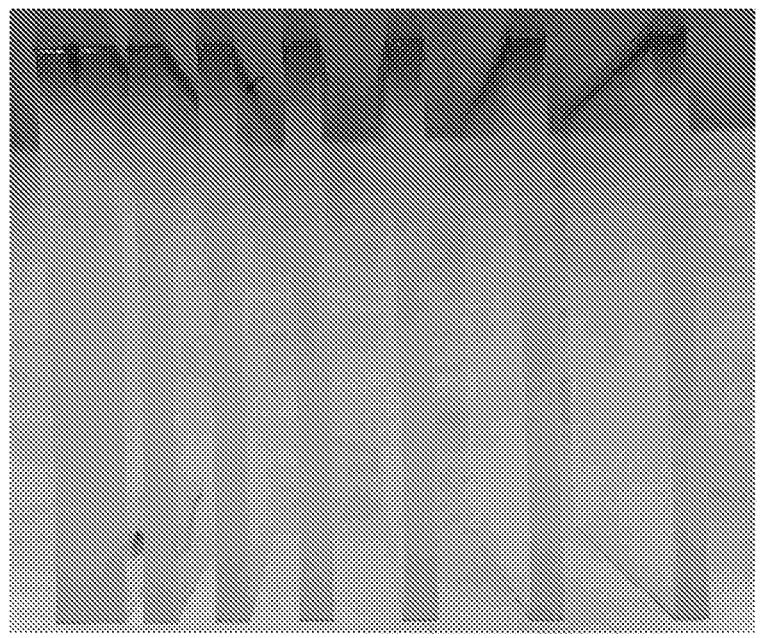
FIG. 4 shows a set of test objects like that of FIG. 1 and produced in like manner from a similar resin, except that no black pigment is included, and 9,10-dibromoanthracene was included.

A clear resin similar to Carbon Inc. RPU 70 was prepared, except that black pigment was omitted, and 9,10-dibromoanthracene was included as a UV absorber (e.g., in an amount of 0.17 percent by weight). The resin alpha was 0.0044. Test objects like that shown in FIG. 1 were then produced with the resin in like manner as in FIG. 1, with results shown in FIG. 4. No substantial yellowing was observed, and no substantial caping was seen.

The foregoing is illustrative of the present invention, and is not to be construed as limiting thereof. The invention is defined by the following claims, with equivalents of the claims to be included therein.

We claim:

1. A method of making a clear or translucent object by additive manufacturing, comprising:
 (a) providing a clear or translucent light polymerizable resin, said resin comprising:
  (i) free radical polymerizable monomers, prepolymers, or a combination thereof;
  (ii) a photoinitiator; and
  (iii) a polysubstituted linear polyacene ultraviolet light absorbing compound that is polysubstituted with substituents independently selected from the group consisting of:

bromo, chloro, —Se—R', and —S—R', where each R' is independently selected from alkyl, aryl, and arylalkyl, wherein said resin has a light absorption coefficient, alpha, of from .0005 to 0.05;
and then
(b) producing by stereolithography with ultraviolet light the clear or translucent object from said light polymerizable resin,
wherein the producing by stereolithography comprises polymerizing a portion of the free radical polymerizable monomers, prepolymers, or combination thereof by free radical polymerization with the photoinitiator and irradiation with ultraviolet light,
wherein the producing by stereolithography is carried out by bottom-up stereolithography wherein a dead zone of the polymerizable resin in contact with a build surface is continually maintained by feeding oxygen to the build surface, and
wherein the polysubstituted linear polyacene ultraviolet light absorbing compound reduces caping in the clear or translucent object by absorbing ultraviolet light during the producing by stereolithography.

2. The method of claim 1, wherein said polyacene is selected from the group consisting of naphthalene, anthracene, tetracene, pentacene, and hexacene.

3. The method of claim 1, wherein said polysubstituted linear polyacene ultraviolet light absorbing compound has a structure of Formula I:

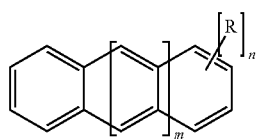

(I)

wherein:
m is 0, 1, 2, 3, 4 or 5;
n is from 2 to 8; and
each R is independently selected from the group consisting of: bromo, chloro, —Se—R', and —S—R', where each R' is independently selected from alkyl, aryl, and arylalkyl.

4. The method of claim 3, wherein each R is bromo.

5. The method of claim 4, wherein said compound of Formula I is selected from the group consisting of 9,10-dibromoanthracene, 2,3,9,10-tetrabromoanthracene, and 5,11-dibromotetracene.

6. The method of claim 4, wherein said compound of Formula I is:

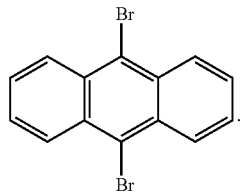 [SMILES: Brc1c2ccccc2c(Br)c2ccccc12]

7. The method of claim 1, wherein said resin further comprises a reactive diluent.

8. The method of claim 1, wherein said resin comprises a dual cure resin.

9. The method of claim 1, further comprising:
(c) washing said object; and then
(d) further curing said object.

10. The method of claim 1, wherein said object is rigid, flexible, or elastic.

11. The method of claim 1, wherein said object comprises a dental aligner, lens, lens cover, or window.

12. A clear or translucent object produced by the method of claim 1.

13. The method of claim 1, wherein the clear or translucent light polymerizable resin comprises
monomers and/or prepolymers comprising (1) an acrylate, a methacrylate, or a combination thereof, and (2) monomers and/or prepolymers comprising reactive end group pairs selected from the group consisting of isocyanate/hydroxyl, isocyanate/amine, isocyanate/carboxylic acid, and any combination thereof.

14. The method of claim 13, wherein said resin further comprises a reactive diluent.

15. The method of claim 13, wherein the isocyanate of the reactive end group pairs comprises protected isocyanate.

16. The method of claim 1, wherein the free radical polymerizable monomers, prepolymers, or combination thereof are present in an amount of from 5 percent by weight to 90 percent by weight of the resin.

17. The method of claim 1, wherein the free radical polymerizable monomers, prepolymers, or combination thereof are present in an amount of from 10 percent by weight to 80 percent by weight of the resin.

* * * * *

UNITED STATES PATENT AND TRADEMARK OFFICE
CERTIFICATE OF CORRECTION

| | |
|---|---|
| PATENT NO. | : 11,472,904 B2 |
| APPLICATION NO. | : 16/488638 |
| DATED | : October 18, 2022 |
| INVENTOR(S) | : Robbins et al. |

It is certified that error appears in the above-identified patent and that said Letters Patent is hereby corrected as shown below:

In the Specification

Column 6, Line 60: Please correct "m" to read --20 µm--

Column 7, Line 29: Please correct "(m)" to read --(µm)--

Signed and Sealed this
Twenty-eighth Day of February, 2023

Katherine Kelly Vidal
*Director of the United States Patent and Trademark Office*